United States Patent
Kunii

(10) Patent No.: US 7,388,723 B2
(45) Date of Patent: Jun. 17, 2008

(54) ND FILTER AND LIGHT QUANTITY DIAPHRAGMING DEVICE INCLUDING THE SAME

(75) Inventor: Koki Kunii, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 296 days.

(21) Appl. No.: 10/552,613

(22) PCT Filed: Nov. 11, 2004

(86) PCT No.: PCT/JP2004/016755

§ 371 (c)(1),
(2), (4) Date: Oct. 6, 2005

(87) PCT Pub. No.: WO2005/047940

PCT Pub. Date: May 26, 2005

(65) Prior Publication Data

US 2006/0279866 A1 Dec. 14, 2006

(30) Foreign Application Priority Data

Nov. 14, 2003 (JP) ............................. 2003-384438

(51) Int. Cl.
*G02B 5/22* (2006.01)
(52) U.S. Cl. .................. 359/888; 359/885; 359/588
(58) Field of Classification Search ................ 359/888, 359/360, 585, 885
See application file for complete search history.

(56) References Cited

U.S. PATENT DOCUMENTS

| 4,960,310 A | * | 10/1990 | Cushing | ...................... 359/888 |
|---|---|---|---|---|
| 5,715,103 A | | 2/1998 | Amano et al. | |
| 6,650,478 B1 | * | 11/2003 | DeBusk et al. | ............. 359/585 |
| 6,842,302 B2 | * | 1/2005 | Nakajima et al. | ........... 359/888 |
| 2003/0026014 A1 | | 2/2003 | Kunii | |

FOREIGN PATENT DOCUMENTS

| JP | 07-063915 | 3/1995 |
|---|---|---|
| JP | 2003-279685 | 9/2002 |
| JP | 2002-350610 | 12/2002 |
| JP | 2002-371236 | 12/2002 |
| JP | 2003-43211 A | 2/2003 |
| JP | 2003-186239 | 7/2003 |
| JP | 2003-202612 | 7/2003 |

* cited by examiner

Primary Examiner—Audrey Y Chang
(74) Attorney, Agent, or Firm—Roberts Mlotkowski Safran & Cole, P.C.; Thomas W. Cole

(57) ABSTRACT

A thin film type ND filter being inexpensive and excelling in durability. There is provided ND filter (0) comprising transparent substrate (1) and, superimposed thereon, light absorption films (3,5) and dielectric films (2,4,6), wherein the light absorption films 3.5 consist of a composition comprising 1 to 30 wt. % of a metal in pure form and 50 wt. % or more of a saturated oxide of the metal with the balance of compounds of the metal containing lower oxides of the metal. Metal raw material of the light absorption films (3,5) is selected from among Ti, Cr, Ni, NiCr, NiFe and NiTi. As for the dielectric films (2,4,6), $SiO_2$ or $Al_2O_3$ is used. Function of reflection prevention is imparted by superimposing the light absorption films (3,5) and dielectric films (2,4,6) in predetermined film thicknesses and in predetermined sequence. Alternatively, a reflection prevention layer may be formed on the back of the substrate (1).

9 Claims, 7 Drawing Sheets

FIG.1

0 ND FILTER

| Layer | Material | PHYSICAL THICKNESS (nm) |
|---|---|---|
| 6 | $SiO_2$ | 78 |
| 5 | Ti, $TiO_2$, $Ti_2O_3$, TiO, TiN | 25 |
| 4 | $SiO_2$ | 51 |
| 3 | Ti, $TiO_2$, $Ti_2O_3$, TiO, TiN | 28 |
| 2 | $SiO_2$ | 59 |
| 1 | SUBSTRATE ; PET | 0.1 (mm) |

FIG.3

| FILM FORMATION CONDITIONS | SUBSTRATE TEMPERATURE | | 100°C |
|---|---|---|---|
| | ULTIMATE VACUUM DEGREE | | $1 \times 10^{-3}$ Pa |
| | Ti | DEPOSITION RATE | 0.5~1nm/sec |
| | | DEPOSITION VACUUM DEGREE | $3 \sim 4 \times 10^{-3}$ Pa |
| | | INTRODUCED GAS | Air (N2 : O2 = 4 : 1) |
| | SiO₂ | DEPOSITION RATE | 0.5~1nm/sec |
| | | INTRODUCED GAS | — |

BOND ENERGY (eV)

|  | Ti (METAL) | TiO or TiN | Ti$_2$O$_3$ | TiO$_2$ |
|---|---|---|---|---|
| ENERGY (eV) | 454.1 | 455.2 | 456.7 | 458.5 |
| PROPORTION (%) | 5% | 5% | 10% | 80% |

|  | C | N | O | Ti |
|---|---|---|---|---|
| PROPORTION(%) | (16.5%) | 2.8% | 53.8% | 27.5% |

0 ND FILTER
- 6: SiO₂
- 5: Ti, TiO₂, Ti₂O₃, TiO, TiN
- 4: SiO₂
- 3: Ti, TiO₂, Ti₂O₃, TiO, TiN
- 2: SiO₂
- 1: SUBSTRATE ; PET
- 7: { DIELECTRIC FILM — 7b / LIGHT ABSORPTION FILM — 7a }

- 204 APERTURE
- 206 DRIVING PORTION
- 201 BASE PLATE
- 202 FILTER BLADE
- 205 APERTURE
- 203 COVER PLATE
- 207

ND FILTER AND LIGHT QUANTITY DIAPHRAGMING DEVICE INCLUDING THE SAME

TECHNICAL FIELD

The present invention relates to an ND filter. The ND (neutral density) filter is used for a light amount diaphragm in order to attenuate a transmitted light volume uniformly throughout a visible area.

RELATED ART

In image pickup systems such as cameras or video cameras, when subject luminance is too high, an amount of light equal to or higher than a predetermined amount could heretofore been fallen on a photo surface even if the aperture is stopped down to the minimum (even if the aperture is brought to the minimum aperture). Therefore, an ND filter is often attached to a part of an image pickup system to regulate the amount of light incident on the photo surface. In this case, as the ND filter has spectral characteristics merely to decrease the amount of incident light, it needs to have uniform transmittance throughout a visible area. In the image pickup systems such as cameras or video cameras, the ND filter based on a plastic film has heretofore been used for the purpose of attenuating the light amount uniformly throughout the visible area.

Recently, thin-film superimposed type ND filters with superior optical characteristics and durability have come into usage, which are described in Patent document 1 to Patent document 3.

Patent document 1: Japanese Patent Publication Laid-open No. 52-113236

Patent document 2: Japanese Patent Publication Laid-open No. 07-063915

Patent document 3: Japanese Patent Publication Laid-open No. 2003-043211

DISCLOSURE OF THE INVENTION

Problem to be Solved by the Invention

Patent document 1 proposes an ND filter comprising alternating layers of metal thin films (such as Ti, Ni) and dielectric films ($MgF_2$). That is, Patent document 1 utilizes metal films as light absorption films. Therefore, the extinction coefficient of the light absorption films is high and the thickness of the metal films to produce the ND filter is very small, so that it is difficult to control the film thickness. Moreover, if the thickness of the light absorption film is small, it is difficult to obtain reflection prevention effects in light of the design of the optical multilayer films.

Patent document 2 proposes an ND filter comprising alternating layers that includes two or more kinds of Ti metal oxide films (extinction coefficient k: 1.0 to 3.0) and dielectric films ($Al_2O_3$, $SiO_2$, $MgF_2$). In Patent document 2, a lower oxide of Ti (such as TiO, $Ti_2O_3$, $Ti3O_5$, $Ti_4O_7$) is used as a starting material for the light absorption film comprising the two or more kinds of Ti metal oxide films. However, when this raw material itself is unstable and the light absorption film contains many unstable substances such as the lower oxides, the optical characteristics change over time. Moreover, the film needs to be formed at a high temperature of 150° C. or more in order to obtain an extinction coefficient k ranging from 1.0 to 3.0, but there is a problem that a substrate is heavily damaged if the plastic film is used for the substrate. Another problem is that the raw materials of the lower oxides themselves are expensive.

Patent document 3 discloses a thin-film ND filter in which light absorption films and dielectric films are superimposed on a transparent substrate. The light absorption film is formed by deposition with a metal material as a raw material, and a mixed gas including oxygen is introduced during the film formation, and it contains oxides of the metal material produced while a constant degree of vacuum is maintained. However, the composition of oxides of the metal material contained in the light absorption film is not clear.

Means for Solving the Problem

In view of the problems of prior art described above, an object of the present invention is to provide a thin-film ND filter which is inexpensive and superior in durability. The following measures have been taken to attain the foregoing object. An ND filter in which light absorption films and dielectric films are superimposed on a transparent substrate is characterized by a composition of the light absorption films which includes 1 to 30 wt % of a single component of a metal and 50 wt % or higher of a saturated oxide component of the metal, and other residual components comprising compounds of the metal including lower oxides of the metal.

Preferably, a metal raw material of the light absorption films is selected from Ti, Cr, Ni, NiCr, NiFe and NiTi. Moreover, $SiO_2$ or $Al_2O_3$ is used for the dielectric films. Preferably, the light absorption films and the dielectric films are superimposed with predetermined thickness and in a predetermined order to provide an reflection prevention function. Alternatively, an reflection prevention layer may be provided on one face of the transparent substrate which is opposite to the other face of the transparent substrate where the light absorption films and the dielectric films are superimposed. In such a case, the reflection prevention layer may be formed of a single layer of a light absorption film or a dielectric film. Otherwise, the reflection prevention layer may be formed of a plurality of layers of a light absorption film and a dielectric film. Otherwise, the reflection prevention layer may be formed of one or more of layers of thermosetting resin or optically setting resin, which is transparent in a visible light range. Such an ND filter is used in a light quantity diaphragming device.

Advantage of the Invention

According to the present invention, a light absorption film which contains a saturated oxide and a pure metal substance as the main components is produced, and the ND filter is produced by a laminate structure of the light absorption films and the dielectric films. In other words, the single component of the metal and its saturated oxide component are mainly contained to keep the residual components including lower oxides of the metal as low as possible, thereby obtaining the ND filter which is stable in characteristics and over time. For example, a metal film is used as a starting material, and, for example, a proper amount of reactive gas (such as $O_2$, $O_2+N_2$, $O_2+Ar$) is added at a substrate temperature of 100° C., whereby a saturated oxide of the metal can be introduced in a film formation process. By properly setting film formation conditions, the proportion of the residual components including the lower oxides of the metal can be reduced. As the present ND filter contains a high proportion of saturated oxide components in addition to the single component of the metal, the thickness of the light absorption film can be greater than that of the light absorption film of the metal simple substance. This makes it easy to design the optical films of the ND filter and also to control a manufacturing process, further allowing an improvement in reliability.

According to the invention described above, the thickness of the light absorption film including saturated oxides is greater than that of the ND filter which only comprises metal films, such that the film thickness is easily controlled and the optical characteristics can be highly reproducible. Further, because there are less unstable components such as lower oxides in the light absorption film, the reliability of the ND filter is increased and the film formation conditions can be regulated even at a low temperature, so that the optimum light absorption film can be formed to obtain ND characteristics. Moreover, since the starting materials are inexpensive metals, the ND filter can be produced at low cost.

BRIEF DESCRIPTION OF THE DRAWINGS

FIG. 1 is a schematic sectional view showing a layer configuration of an ND filter according to the present invention.

FIG. 3 is a table diagram representing film formation conditions for the ND filter according to the present invention.

DESCRIPTION OF REFERENCE NUMBERS

Figure 2:
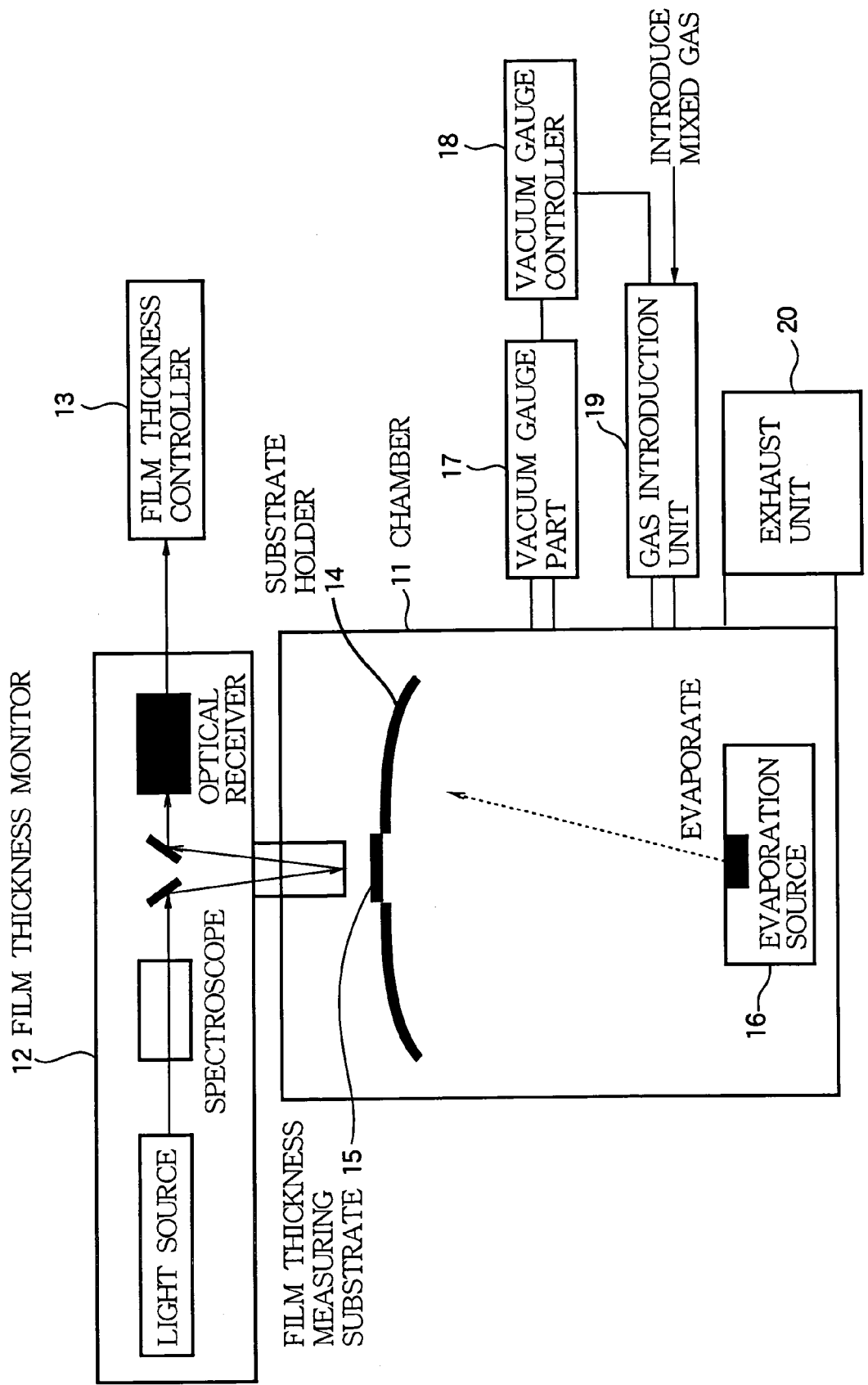
FIG. 2 is a schematic block diagram showing a vacuum deposition device used to produce the ND filter according to the present invention.

0 ND filter
1 transparent substrate
2 dielectric film
3 light absorption film
4 dielectric film
5 light absorption film
6 dielectric film
7 reflection prevention layer

BEST MODE FOR CARRYING OUT THE INVENTION

An embodiment of the present invention will hereinafter be described in detail in reference to the drawings. FIG. 1 is a schematic sectional view showing a configuration of a thin-film ND filter according to the present invention. As shown, the present ND filter 0 is a thin-film type in which light absorption films 3, 5 and dielectric films 2, 4, 6 are superimposed on a transparent substrate 1. A characteristic point is that a composition of the light absorption films 3, 5 includes 1 to 30 wt % of a pure component of a metal and 50 wt % or higher of a saturated oxide component of the metal, and balance components comprising compounds of the metal including lower oxides of the metal. Such light absorption films 3, 5 can be formed by reactive physical vapor deposition (PVD) including metal material as raw material. The metal raw material of the light absorption films 3, 5 can be selected from Ti, Cr, Ni as well as alloys such as NiCr, NiFe and NiTi. On the other hand, $SiO_2$ or $Al_2O_3$ can be used for the dielectric films 2, 4, 6. The light absorption films 3, 5 and the dielectric films 2, 4, 6 can be laminated with predetermined thicknesses and in a predetermined sequence to provide the ND filter with a reflection prevention function. The thin-film ND filter having such a configuration is used in a light quantity diaphragming device.

Referring continuously to FIG. 1, a specific film configuration of the ND filter 0 will be described. First, the transparent substrate 1 comprises PET (polyethylene terephthalate) having a thickness of 0.1 mm. However, the present invention is not limited thereto, and polyester films or polycarbonate films other than PET can be used. The polyester film or polycarbonate film such as PET is preferable to a light amount diaphragm, but glass or plastics transparent in a used wavelength region can properly be used as the transparent substrate 1 as long as the usage is not specifically limited. The first dielectric film 2 formed on the transparent substrate 1 comprises $SiO_2$, and its physical film thickness is 59 nm. The first light absorption film 3 formed thereon includes metal Ti and its saturated oxide $TiO_2$ as the main components, and contains, as other residual components, lower oxides such as $Ti_2O_3$, TiO and by-products such as metal compound TiN. The physical thickness of the first light absorption film 3 is 28 nm. The second dielectric film 4 formed thereon comprises $SiO_2$, and its physical film thickness is 51 nm. The second light absorption film 5 formed thereon also includes metal Ti and its saturated oxide $TiO_2$ as the main components, and contains, as other residual components, lower oxides such as $Ti_2O_3$, TiO and metal nitride TiN. The physical thickness of the second light absorption film 5 is 25 nm. The third dielectric film 6 formed thereon comprises $SiO_2$, and its physical film thickness is 78 nm. It is to be noted that such a laminate structure is illustrative and does not limit the scope of the present invention. In the case of the optical thin film, a transparent ceramic material is denoted as the dielectric film in an ordinary used wavelength. By laminating the dielectric films having the thickness (about several times as large as the wavelength) at which interference effects of light emerges, optical characteristics (such as a reflection amount, transmitting amount, polarization, phase) of incident light can be freely adjusted. In the present embodiment, a layer configuration shown in FIG. 1 provides the ND filter with the reflection prevention function. On the other hand, the light absorption films literally serve to absorb incident light in the used wavelength region, and a metal is usually used in a visible area. In the present invention, its saturated oxide is particularly introduced into the metal to improve optical characteristics and physical characteristics.

The ND filter shown in FIG. 1 can be formed, for example, by vacuum deposition. FIG. 2 is a schematic block diagram showing one example of a vacuum deposition device used to produce the ND filter shown in FIG. 1. As shown, the present device is configured mainly with a vacuum chamber 11, onto which a film thickness monitor 12 and a film thickness controller 13 are attached. A substrate holder 14 which supports and fixes a substrate to be treated, a film thickness measuring substrate 15 and a deposition source 16 are disposed in the chamber 11. The film thickness monitor 12 comprises a light source, a spectroscope and an optical receiver. Light exiting from the spectroscope falls on the film thickness measuring substrate 15, and the light reflected therefrom enters the optical receiver whose output is sent to the film thickness controller 13. In this way, the film thickness is monitored in real time such that the light absorption films and the dielectric films having desired thicknesses are formed on the substrate.

A vacuum gauge part 17, a vacuum gauge controller 18, a gas introduction unit 19 and an exhaust unit 20 are connected to the chamber 11. In the present embodiment, an APC method is adopted to maintain a constant degree of vacuum in the chamber 11. Specifically, feedback is given via the vacuum gauge part 17 and the vacuum gauge controller 18, and the gas introduction unit 19 is controlled to regulate an amount of mixed gas introduced into the chamber 11. However, the present invention is not limited thereto, and may adopt a method of regulating the amount of gas introduced into the chamber 11 to a constant amount by a needle valve.

FIG. 3 is a diagram representing film formation conditions when the vacuum deposition device shown in FIG. 2 is used to produce the ND filter shown in FIG. 1. As shown, the substrate temperature is 100° C. Moreover, the ultimate vacuum of the chamber is set to $1 \times 10^{-3}$ Pa. Herein, Ti is used as a raw material to form the light absorption films 3, 5, and a deposition rate is set to 0.5 to 1.0 nm/sec. In the present embodiment, air in which nitrogen and oxygen are mixed at 4:1 is used as a reactive gas to be introduced when Ti is deposited. However, the present invention is not limited thereto, and a mixed gas is generally used which contains oxygen in a proportion of 50% or low. For example, a mixed gas of $O_2$ and Ar can be used instead of a mixed gas of $O_2$ and $N_2$. It is to be noted that a deposition vacuum degree when a mixed gas containing oxygen is introduced has been set to 3 to $4 \times 10^{-3}$ Pa. However, the present invention is not limited thereto, and if it is maintained at a constant degree between $1 \times 10^{-3}$ Pa to $1 \times 10^{-2}$ Pa, the light absorption film can generally be formed which has satisfactory optical characteristics and physical characteristics and which includes a metal and its saturated oxide as the main components and reduces the proportion of residual lower oxides. Subsequently, when the dielectric films 2, 4, 6 are formed, $SiO_2$ is used as the deposition source, and the deposition rate is set to 0.5 to 1.0 nm/sec. When $SiO_2$ is formed, the reactive gas is not specifically introduced. In the present embodiment, the vacuum deposition is used to form the light absorption film. Instead, other PVD film formation methods that can form minute films can also be utilized, such as an ion plating method, an ion assisted method and a sputtering method.

Figures 4, 5:
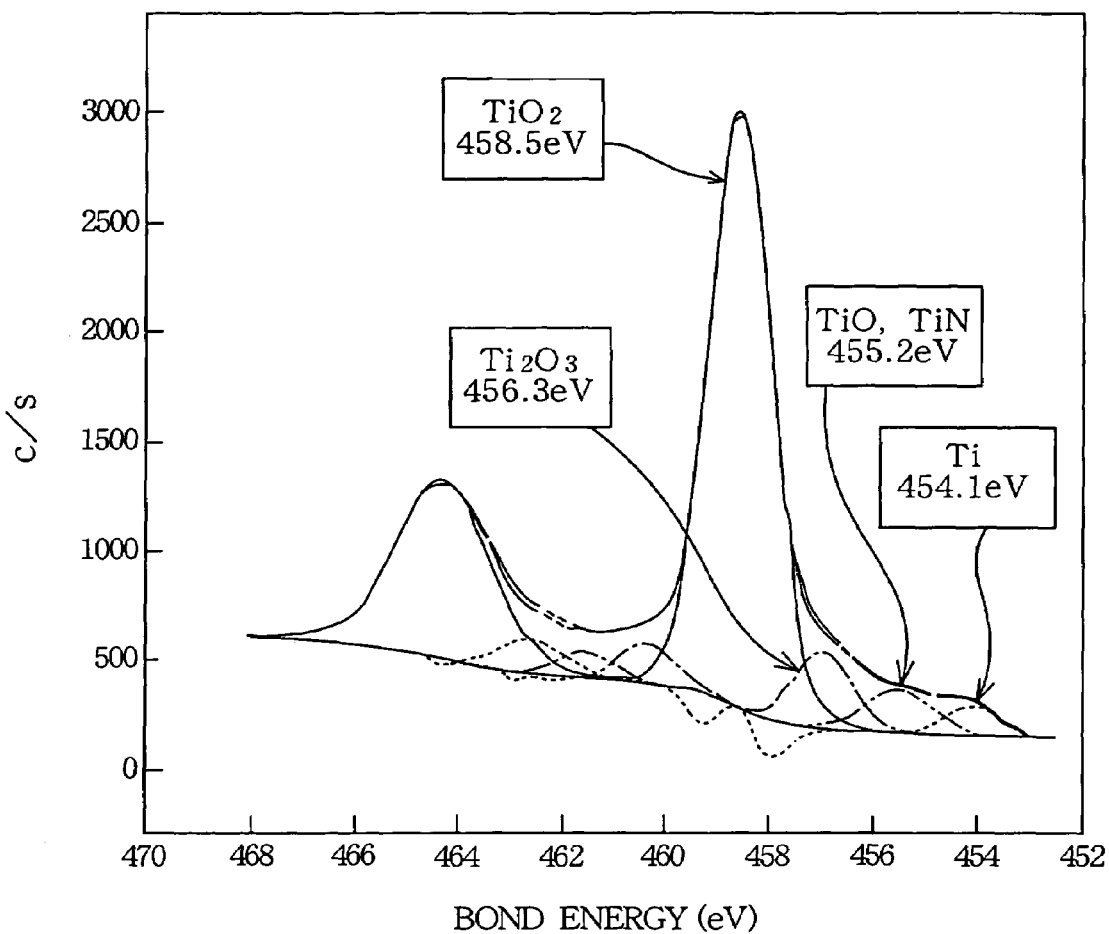
FIG. 4 is an XPS spectral graph showing the composition of a light absorption film included in the ND filter according to the present invention.
FIG. 5 is a table diagram representing the composition of the light absorption film included in the ND filter according to the present invention.

FIG. 4 is a graph showing results of analyzing the composition of the light absorption film formed by the reactive PVD on the conditions shown in FIG. 3. An X-ray photoelectron spectroscopic analyzer (XPS, ESCA) is used for this analysis. If soft X-rays having particular energy are applied to a light absorption film surface in a high vacuum, electrons are released from a sample due to a photoelectric effect. These are led to an analyzer, and separated in accordance with kinetic energy of the electrons to be detected as a spectrum. FIG. 4 represents this spectrum. Photoelectrons are also released from deeper areas, but lose kinetic energy due to inelastic scattering before reaching the surface of the sample, so that they are not detected as a peak and will be a background of the spectrum. The photoelectrons in an area several nm deep which have escaped from the sample surface without causing inelastic scattering are detected as a peak as shown in the graph and used for the analysis. A horizontal axis of the spectrum in FIG. 4 indicates bond energy of the electrons. The bond energy can be obtained by a difference in which the kinetic energy of the photoelectrons is subtracted from the energy of the irradiated soft X-rays. Since inner shell electrons of various atoms have intrinsic bond energy, the kind of element can be checked from the bond energy of the detected electrons, and the proportion of element can be checked from signal strength. The spectrum in FIG. 4 is a result of detecting the bond energy of 2p inner shell electrons of an atom. Further, if the chemical bonding states of the various elements are different, the bond energy slightly changes and distinctively detected. This enables quantitative determination of the metal and its oxidation state. In the shown spectrum, the peak of metal Ti is observed at 454.1 eV, the peak of its saturated oxide $TiO_2$ is observed at 458.5 eV, the peak of lower oxide $Ti_2O_3$ is observed at 456.3 eV, and the peak of another lower oxide TiO is observed at 455.2 eV. It is to be noted that because the peaks of TiO and TiN emerge at substantially equal points, a peak of 455.2 eV seems to include TiN in addition to TiO.

FIG. 5 is a table diagram representing the composition of the light absorption film calculated in accordance with the analysis shown in FIG. 4. Looking at the proportion, metal Ti is 5%, TiO/TiN are 5%, $Ti_2O_3$ is 10%, and $TiO_2$ is 80%. As shown in the table diagram of FIG. 5, the composition of the light absorption film formed on the conditions shown in FIG. 3 includes a Ti metal simple substance with saturated oxide $TiO_2$ as the main components, and further includes the lower oxide mixed as a residual component. It is to be noted that TiN is also presumed to be present because nitrogen is detected in the light absorption film. The extinction coefficients of the light absorption films having such a composition are about 0.5 to 1.0.

Figures 6, 7:
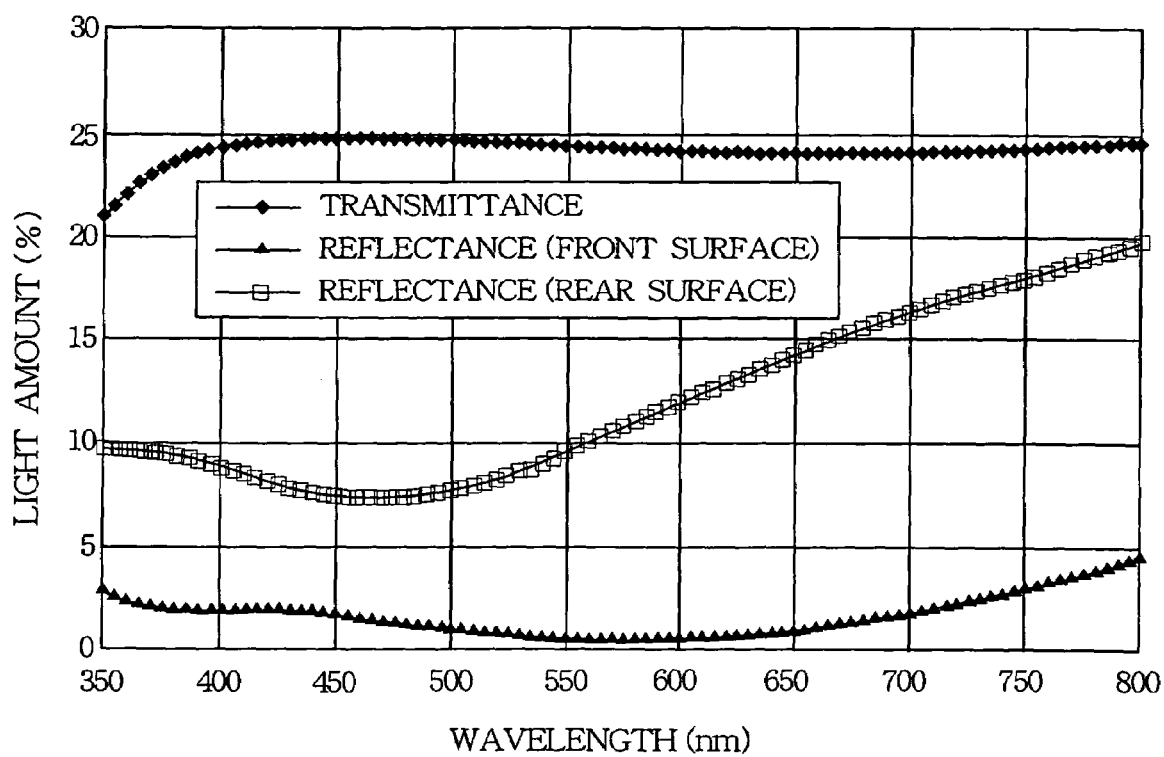
FIG. 6 is a table diagram representing the elemental composition of the light absorption film included in the ND filter according to the present invention.
FIG. 7 is a graph showing the optical characteristics of the ND filter according to the present invention.

FIG. 6 shows results of analyzing element proportions in the light absorption film surface, which are also obtained by the XPS. In accordance with the shown table diagram, the element proportions of the light absorption film are 53.8% of O, 27.5% of Ti, and 2.8% of N. In addition, 16.5% of other C is included, which seems to be a residual error of organic matters such as an organic solvent and contamination remaining on the surface of the light absorption film.

FIG. 7 is a graph showing the optical characteristics of the ND filter when the laminate structure shown in FIG. 1 is produced on the film formation conditions shown in FIG. 3. The horizontal axis represents the wavelength in the visible area, and the vertical axis represents the light amount (%) indicating the scale of reflectance and transmittance. As apparent from the graph, the present ND filter shows neutral transmitting characteristics in the visible area, so that the ND filter can be produced whose reflectance on the surface is kept low. It has further been found out that when the present ND filter is subjected to an environmental test, it shows significantly satisfactory durability. In some cases, in order to stabilize unstable components such as the lower oxide included in the light absorption film, a heat treatment or the like may be performed in an oxygen environment.

Figure 8:
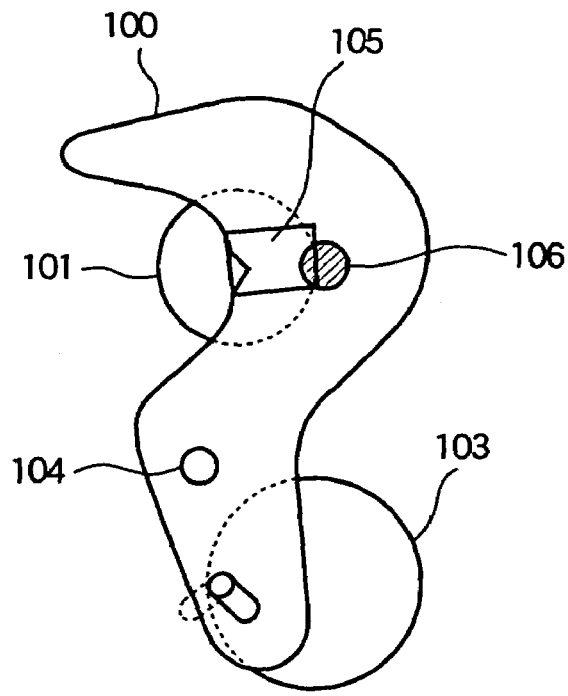
FIG. 8 is a schematic diagram in which the ND filter according to the present invention is applied to a light quantity diaphragming device for a camera.

FIG. 8 is a schematic diagram in which the present ND filter is applied to the light quantity diaphragming device for a camera. An ND filter 105 is fixedly provided, for example, by an adhesive 106 or by thermal welding, in a concave portion of illustrated one of aperture blades 100 formed in pairs. The aperture blade 100 is configured to pivot around a pivotal support pin 104 by a driving portion 103 to open/close an aperture 101.

Figure 9:
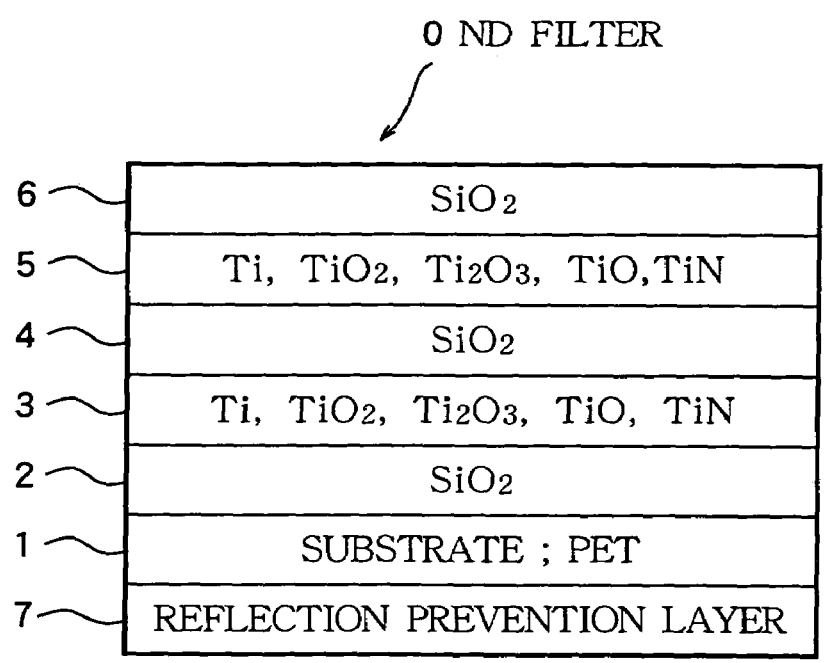
FIG. 9 is a schematic sectional view showing a layer configuration of an ND filter according to another embodiment of the present invention.

FIG. 9 is a schematic sectional diagram showing a layer structure of another embodiment of the ND filter according to the present invention. In order to facilitate the understanding of the embodiment, like reference numerals are used to denote respective parts corresponding to the previous embodiment shown in FIG. 1. As shown in the figure, A transparent substrate 1 composed of PET has one face at an upper side where dielectric films 2, 4 and 6 and light absorption films 3 and 5 are alternately superimposed. The transparent substrate 1 has an opposite face at a rear side where an reflection prevention layer 7 is formed. This reflection prevention layer 7 is formed on the face different from the other face which is superimposed with the ND filter 0, in order to suppress ghost or flea which would occur in an optical system incorporating the ND filter 0. This reflection prevention layer 7 is formed of a single layer of a light absorption film or a dielectric film so as to reduce reflection of light at the face opposite to the laminate face of the ND filter.

Figure 10:
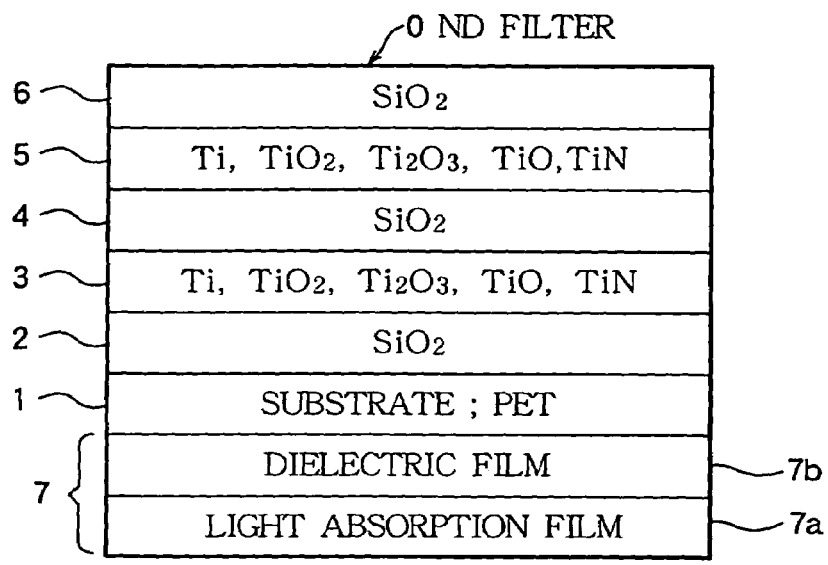
FIG. 10 is a schematic sectional view showing a layer configuration of an ND filter according to a further embodiment of the present invention.

FIG. 10 is a schematic sectional diagram showing a layer structure of a further embodiment of the ND filter according to the present invention. In order to facilitate the understanding of the embodiment, like reference numerals are used to denote respective parts corresponding to the previous embodiment shown in FIG. 9. In this embodiment, an reflection prevention layer 7 is formed on the rear face of the transparent substrate 1. Characterizingly, this reflection prevention layer 7 is formed of a plurality of layers of a light absorption film 7a and a dielectric film 7b, thereby obtaining more significant effect of suppressing reflection. The material of the dielectric film 7b may be selected not only from the materials used in the ND filter according to the present invention, but also selected from other materials (e.g., SiO and $MgF_2$). Further, the material of the light absorption film 7a may be selected not only from the material used in the ND filter according to the present invention, but also selected from other materials (e.g., $Ta_2O_5$, $ZrO_2$, TiO, $TiO_x$ ($1 \leq x \leq 2$), $Nb_2O_5$, $CeO_2$ and ZnS). Further, The reflection prevention layer 7 may be formed of a mixture of two or more of these materials.

Alternatively, the reflection prevention layer 7 may be formed of one or more of layers of thermosetting resin or optically setting resin which is transparent in a visible light range. However, in case that ghost or flea hardly occurs in an optical system incorporating the ND filter, needless to say, it is not necessary to provide an reflection prevention layer 7.

Figure 11:
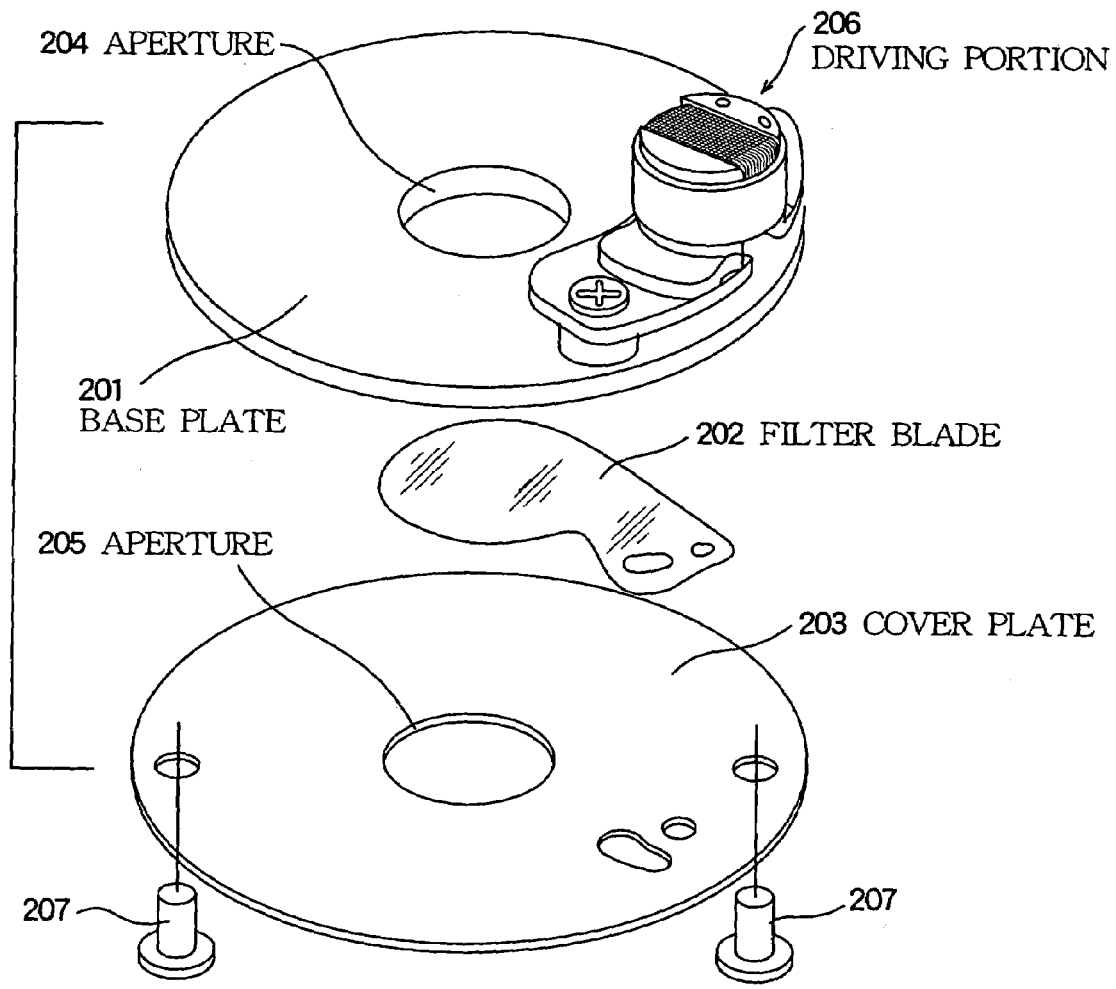
FIG. 11 is a schematic perspective exploded diagram of another example in which the ND filter according to the present invention is applied to a light quantity diaphragming device for a camera.

FIG. 11 is a schematic perspective exploded diagram showing another example in which the ND filter according to the present invention is applied to the light quantity diaphragming device for a camera. As shown in the figure, the light quantity diaphragming device for a camera is basically composed of a base plate 201, a filter blade 202 and a cover plate 203. These parts are assembled by means of pins 207. The base plate 201 has a circular aperture 204 which limits incident light. The cover plate 203 has an aperture 205 of a diameter greater than the aperture 204 of the base plate 201. The base plate 201 and the cover plate 203 form therebetween a blade room where the filter blade 202 is arranged. The filter blade 202 is formed of the ND filter according to the present invention, and has the same outer shape as a regularly used diaphragm blade. This filter blade 202 is pivotally supported by a shaft (not shown) provided on the base plate 201, and structured to reciprocally move by a driving portion 206 between a position where the filter blade 202 closes the apertures 204 and 205 and another position where the filter blade 202 escapes from the apertures 204 and 205.

The invention claimed is:

1. An ND filter in which light absorption films and dielectric films are superimposed on a transparent substrate, the ND filter characterized by:
    a composition of the light absorption films which includes 1 to 30 wt % of a pure component of a metal and 50 wt % or higher of a saturated oxide component of the metal, and other residual components comprising compounds of the metal including lower oxides of the metal.

2. The ND filter according to claim 1, characterized in that a metal raw material of the light absorption films is selected from Ti, Cr, Ni, NiCr, NiFe and NiTi.

3. The ND filter according to claim 1, characterized in that $SiO_2$ or $Al_2O_3$ is used for the dielectric films.

4. The ND filter according to claim 1, characterized in that the light absorption films and the dielectric films are superimposed with predetermined thickness and in a predetermined order to provide an reflection prevention function.

5. The ND filter according to claim 1, characterized in that a reflection prevention layer is provided on one face of the transparent substrate which is opposite to the other face of the transparent substrate where the light absorption films and the dielectric films are superimposed.

6. The ND filter according to claim 5, characterized in that the reflection prevention layer is formed of a single layer of a light absorption film or a dielectric film.

7. The ND filter according to claim 5, characterized in that the reflection prevention layer is formed of a plurality of layers of a light absorption film and a dielectric film.

8. The ND filter according to claim 5, characterized in that the reflection prevention layer is formed of one or more of layers of thermosetting resin or optically setting resin which is transparent in a visible light range.

9. A light quantity diaphragming device using the ND filter according to claim 1.

* * * * *